(12) United States Patent  (10) Patent No.: US 8,620,391 B2
Edwards  (45) Date of Patent: Dec. 31, 2013

(54) MUSICAL CELL PHONE ACCESSORY

(76) Inventor: Dustin Edwards, Fenton, MI (US)

( * ) Notice: Subject to any disclaimer, the term of this patent is extended or adjusted under 35 U.S.C. 154(b) by 51 days.

(21) Appl. No.: 13/461,746

(22) Filed: May 1, 2012

(65) Prior Publication Data

US 2013/0296002 A1  Nov. 7, 2013

(51) Int. Cl.
H04B 1/38 (2006.01)
(52) U.S. Cl.
USPC ..... 455/572; 455/556.1; 455/557; 455/179.1; 455/187.1; 709/217
(58) Field of Classification Search
USPC ............... 455/572, 556.1, 557, 179.1, 187.1; 709/217
See application file for complete search history.

(56) References Cited

U.S. PATENT DOCUMENTS 6,304,764 B1 * 10/2001 Pan ............................ 455/569.2
2005/0248717 A1 * 11/2005 Howell et al. .................. 351/41
2006/0168097 A1 * 7/2006 Pittelli .......................... 709/217

* cited by examiner

Primary Examiner — Sanh Phu

(57) ABSTRACT

The present invention is a cordless musical cell phone accessory that includes a planar base, a radio station tuner that is disposed on the planar base and one or more preset buttons that are depressed to put the musical cell phone accessory in communication with one or more predetermined radio stations. The accessory also includes a headphone jack that is inserted into a headphone jack inlet of a cell phone to connect the musical cell phone accessory to the cell phone, a display screen that is disposed on the planar base and a battery pack that is built into the planar base to provide electrical power to the accessory. The accessory can also include an additional battery pack that is attached to the cell phone utilizing the musical cell phone accessory.

20 Claims, 1 Drawing Sheet

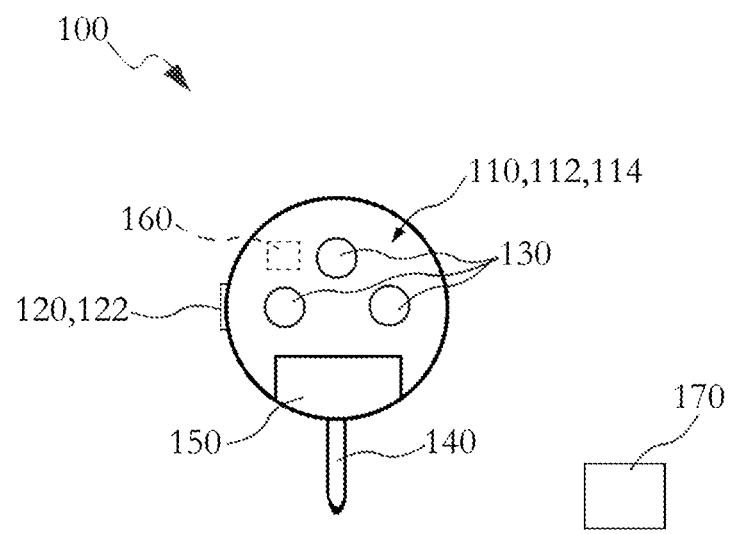

MUSICAL CELL PHONE ACCESSORY

TECHNICAL FIELD & BACKGROUND

Currently there are many smartphones that have the ability to play music. However, it may be difficult for a person to listen to their favorite songs while driving or in other busy environments.

The present invention generally relates to a cell phone accessory. More specifically, the invention is a musical cell phone accessory.

It is an object of the invention to provide a musical cell phone accessory that allows a user to play music from a cell phone.

It is an object of the invention to provide a musical cell phone accessory that is cordless to provide convenience and can be used in combination with any suitable cell phone.

It is an object of the invention to provide a musical cell phone accessory that includes an additional battery pack that can enhance a user's cell phone life.

What is really needed is a musical cell phone accessory that allows a user to play music from a cell phone that is cordless to provide convenience and can be used in combination with any suitable cell phone that includes an additional battery pack that can enhance a user's cell phone life.

BRIEF DESCRIPTION OF THE DRAWINGS

The present invention will be described by way of exemplary embodiments, but not limitations, illustrated in the accompanying drawings in which like references denote similar elements, and in which:

FIG. 1 illustrates a front view of a musical cell phone accessory, according to an embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates a front view of a musical cell phone accessory 100, according to an embodiment of the present invention. The musical cell phone accessory 100 is typically utilized in combination with any suitable cell phone. The musical cell phone accessory 100 is made of metal but can be made of any suitable material.

The musical cell phone accessory 100 includes a planar base 110, a tuner 120, one or more preset buttons 130, a headphone jack 140, a display screen 150, a battery pack 160 and an additional battery pack 170. The planar base 110 has a front facing 112 and is circular-shaped 114 although the planar base 110 can be any suitable shape such as square-shaped, rectangular-shaped or triangular-shaped. The tuner 120 is a radio station tuner 122 that is disposed on the front facing 112 of the planar base 110. The one or more preset buttons 130 can be depressed to put the musical cell phone accessory 100 in communication with one or more predetermined radio stations. The headphone jack 140 is inserted into a headphone jack inlet of a cell phone (not shown) to connect the musical cell phone accessory 100 to the cell phone. The display screen 150 is disposed on the front facing 112 of the planar base 110 to indicate the radio station being selected. The battery pack 160 is built into the planar base 110 to provide electrical power to the musical cell phone accessory 100, which can also be powered by the cell phone as well. The additional battery pack 170 can be attached to the cell phone utilizing the musical cell phone accessory 100 to provide additional electrical power if needed.

The musical cell phone accessory is a device to play music through one or more selected radio stations through a cell phone while in a car or other busy environment. The musical cell phone accessory relatively quickly and easily attaches to the headphone jack of any suitable mobile phone. The circular-shaped planar base has three preset buttons with the radio station tuner on the left and a display screen at the bottom but can have any suitable quantity of preset buttons. The musical cell phone accessory has the option of being powered by the cell phone or through a built-in battery pack. The musical cell phone accessory may be readily available at stores where electronics are sold. The musical cell phone accessory features an attachment for listening to music from a mobile phone on the car radio as well. The musical cell phone accessory is designed to be cordless allowing for static-free radio playback.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:
1. A musical cell phone accessory, comprising:
a planar base with a front facing; a tuner that is disposed on said front facing of said planar base;
one or more preset buttons that are depressed to put said musical cell phone accessory in communication with one or more predetermined radio stations;
a headphone jack that is inserted into a headphone jack inlet of a cell phone to connect said musical cell phone accessory to said cell phone;
a display screen that is disposed on said front facing of said planar base; and
a battery pack that is built into said planar base to provide electrical power to said musical cell phone accessory.
2. The musical cell phone accessory according to claim 1, wherein said planar base is circular-shaped.
3. The musical cell phone accessory according to claim 1, wherein said tuner is a radio station tuner.

4. The musical cell phone accessory according to claim 1, wherein said display screen indicates said predetermined radio station selected.

5. The musical cell phone accessory according to claim 1, wherein said battery pack which is powered by said cell phone.

6. The musical cell phone accessory according to claim 1, wherein said musical cell phone accessory is made of metal.

7. A musical cell phone accessory, comprising:
a planar base with a front facing;
a tuner that is disposed on said front facing of said planar base;
one or more preset buttons that are depressed to put said musical cell phone accessory in communication with one or more predetermined radio stations;
a headphone jack that is inserted into a headphone jack inlet of a cell phone to connect said musical cell phone accessory to said cell phone;
a display screen that is disposed on said front facing of said planar base;
a battery pack that is built into said planar base to provide electrical power to said musical cell phone accessory; and
an additional battery pack that is attached to said cell phone utilizing said musical cell phone accessory.

8. The musical cell phone accessory according to claim 7, wherein said planar base is circular-shaped.

9. The musical cell phone accessory according to claim 7, wherein said tuner is a radio station tuner.

10. The musical cell phone accessory according to claim 7, wherein said display screen indicates said predetermined radio station selected.

11. The musical cell phone accessory according to claim 7, wherein said battery pack which is powered by said cell phone.

12. The musical cell phone accessory according to claim 7, wherein said musical cell phone accessory is made of metal.

13. The musical cell phone accessory according to claim 7, wherein said additional battery pack provides additional electrical power to said cell phone.

14. A cordless musical cell phone accessory, comprising:
a planar base with a front facing;
a radio station tuner that is disposed on said front facing of said planar base;
one or more preset buttons that are depressed to put said musical cell phone accessory in communication with one or more predetermined radio stations;
a headphone jack that is inserted into a headphone jack inlet of a cell phone to connect said musical cell phone accessory to said cell phone;
a display screen that is disposed on said front facing of said planar base;
a battery pack that is built into said planar base to provide electrical power to said musical cell phone accessory; and
an additional battery pack that is attached to said cell phone utilizing said musical cell phone accessory.

15. The musical cell phone accessory according to claim 14, wherein said planar base is circular-shaped.

16. The musical cell phone accessory according to claim 14, wherein said display screen indicates said predetermined radio station selected.

17. The musical cell phone accessory according to claim 14, wherein said battery pack which is powered by said cell phone.

18. The musical cell phone accessory according to claim 14, wherein said musical cell phone accessory is made of metal.

19. The musical cell phone accessory according to claim 14, wherein said additional battery pack provides additional electrical power to said cell phone.

20. The musical cell phone accessory according to claim 14, wherein said musical cell phone accessory eliminates static.

* * * * *